(12) United States Patent
Jia et al.

(10) Patent No.: US 12,240,979 B2
(45) Date of Patent: Mar. 4, 2025

(54) REINFORCED RUBBER COMPOSITION

(71) Applicants: Li Jia, Hudson, OH (US); Yu Sun, Cuyahoga Falls, OH (US)

(72) Inventors: Li Jia, Hudson, OH (US); Yu Sun, Cuyahoga Falls, OH (US)

(73) Assignee: The University of Akron, Akron, OH (US)

( * ) Notice: Subject to any disclaimer, the term of this patent is extended or adjusted under 35 U.S.C. 154(b) by 234 days.

(21) Appl. No.: 17/583,632

(22) Filed: Jan. 25, 2022

(65) Prior Publication Data

US 2022/0235204 A1    Jul. 28, 2022

Related U.S. Application Data

(60) Provisional application No. 63/141,118, filed on Jan. 25, 2021.

(51) Int. Cl.
*C08L 9/00* (2006.01)
*C08K 5/37* (2006.01)

(52) U.S. Cl.
CPC ........ *C08L 9/00* (2013.01); *C08K 5/37* (2013.01); *C08L 2205/025* (2013.01); *Y02W 30/62* (2015.05)

(58) Field of Classification Search
CPC .... C08L 9/00; C08L 2205/025; Y02W 30/62; C08K 5/37; C08K 3/04; C08K 5/09; C08K 3/22; C08C 19/00; C08C 19/30
See application file for complete search history.

(56) References Cited

U.S. PATENT DOCUMENTS

2017/0107362 A1 *  4/2017  Tanabe ............... C08K 3/36

FOREIGN PATENT DOCUMENTS

| JP | 6844889 B2 * | 3/2021 | ............... B60C 1/00 |
| WO | WO-2017061441 A1 * | 4/2017 | ............... B60C 1/00 |

OTHER PUBLICATIONS

Jia et al. Reinforcement of Rubber Using Reactive Oligo(b-Alanine) Supramolecular Fillers, Rubber Chemistry and Technology 2019, 92 (1), 198-217. (Year: 2019).*

Qian MS Thesis 2018 Reinforcement of Elastomers By Reactive Ionic Surfactant Filler (Year: 2018).*

* cited by examiner

*Primary Examiner* — Marc S Zimmer
*Assistant Examiner* — Surbhi M Du
(74) *Attorney, Agent, or Firm* — Renner, Kenner, Greive, Bobak Taylor & Weber

(57) ABSTRACT

A curable rubber composition including a rubber, a plurality of ground particles, and a reactive surfactant represented by the formula: X—Y—Z where X is a reactive group capable of forming covalent links with the rubber during compounding or vulcanization, Y is a hydrophobic linkage, and Z is a polar group capable of forming self-assemblies via intermolecular interactions, and wherein the reactive surfactant is incompatible with the rubber and a method of making the same.

19 Claims, No Drawings

REINFORCED RUBBER COMPOSITION

CROSS-REFERENCE TO RELATED APPLICATIONS

The present application claims priority to U.S. Provisional Patent Application Ser. No. 63/141,118 filed Jan. 25, 2021, the entirety of which is incorporated herein by reference.

FIELD OF THE INVENTION

The present invention discloses the use of reactive surfactants as reinforcing agents for rubber vulcanizates that contain ground rubber particles made from previously vulcanized rubbers. Specifically, the use of the reactive surfactants enhances the adhesion between the ground particles of vulcanized rubber and fresh rubber and alleviates the modulus contrast at the interface between the ground rubber particles and the fresh rubber.

BACKGROUND OF THE INVENTION

Millions of tons of vulcanized rubber items are produced each year. Recycling of vulcanized rubbers, most of which are from vehicle tires, presents a unique challenge different from the recycling of thermoplastics. Vulcanized rubbers cannot be easily reprocessed without breaking the covalent cross-links of the rubber network. Processability is achievable only via devulcanization. The resultant rubber, which is termed reclaimed rubber, affords inferior mechanical properties upon vulcanization because it is structurally and compositionally different from its virgin counterpart. The reclaimed rubbers are therefore only suitable for downcycling for applications less demanding than tires, for example, for road paving and making ebonite.

An alternative widely explored route of rubber recycling is to grind the vulcanized rubber to small particles and to then blend the ground rubber particles (GRPs) with other polymers to make new products Although they account for most recycled rubbers, GRPs also significantly reduce the mechanical properties even if only present at a small fraction in a blend with virgin rubber. Blends featuring GRPs are also downcycled for making items such as floor mats and sport turfs.

There is a need for in the art for additional methods and compositions for reinforcing rubber compositions incorporating GRPs.

SUMMARY OF THE INVENTION

An embodiment of the present invention provides a curable rubber composition including a rubber, a plurality of ground rubber particles, and a reactive surfactant represented by the formula:

X—Y—Z where X is a reactive group, Y is a hydrophobic linkage, and Z is a polar group, and where the reactive group is capable of forming covalent links with the rubber during compounding or vulcanization and the polar group is capable of forming self-assemblies via intermolecular interactions, and wherein the reactive surfactant is incompatible with the rubber.

Another embodiment of the present invention provides a curable rubber composition as in any embodiment above, wherein the curable rubber composition includes at least 1 parts per hundred rubber of the plurality of ground rubber particles.

Another embodiment of the present invention provides a curable rubber composition as in any embodiment above, wherein the reactive group is selected from a sulfur-containing group.

Another embodiment of the present invention provides a curable rubber composition as in any embodiment above, wherein the reactive group is a thiol group.

Another embodiment of the present invention provides a curable rubber composition as in any embodiment above, wherein the hydrophobic linkage is a hydrocarbon chain.

Another embodiment of the present invention provides a curable rubber composition as in any embodiment above, wherein the hydrocarbon chain includes between 2 and 30 carbon atoms.

Another embodiment of the present invention provides a curable rubber composition as in any embodiment above, wherein the polar group includes at least one β-alanine unit.

Another embodiment of the present invention provides a curable rubber composition as in any embodiment above, wherein the polar group includes two β-alanine units, wherein at least one of the two β-alanine units is terminated by a terminal alkyl chain.

Another embodiment of the present invention provides a curable rubber composition as in any embodiment above, wherein the polar group includes a phosphate anion charge balanced by a cation with the general formula: $-(RO)PO_3^- (1/n)\text{cation}^{n+}$.

Another embodiment of the present invention provides a curable rubber composition as in any embodiment above, wherein the polar group includes a sulfonate anion charge balanced by a cation with the general formula: $-SO_3^-(1/n)\text{cation}^{n+}$ where n=1 or 2.

Another embodiment of the present invention provides a curable rubber composition as in any embodiment above, wherein the curable rubber composition includes at least 1.0 parts per hundred rubber of the reactive surfactant.

Another embodiment of the present invention provides a curable rubber composition as in any embodiment above, wherein the curable rubber composition includes a ratio of the plurality of ground rubber particles to the reactive surfactant, by weight, of from 2:1 to 50:1.

Another embodiment of the present invention provides a curable rubber composition as in any embodiment above, wherein the curable rubber composition optionally further includes one or more of antioxidants, antidegradants, additional fillers, oils, plasticizers, resins, waxes, and curatives.

Another embodiment of the present invention provides a curable rubber composition as in any embodiment above, wherein the reactive surfactant is incompatible with the rubber.

Another embodiment of the present invention provides a curable rubber composition as in any embodiment above, wherein the reactive surfactant is mixed directly with rubber and the plurality of ground rubber particles.

An embodiment of the present invention provides a method of making a curable rubber composition that is prepared by a process including: mixing a masterbatch comprising a rubber, providing a plurality of ground rubber particles and a reactive surfactant represented by the formula:

X—Y—Z where X is a reactive group, Y is a hydrophobic linkage, and Z is a polar group, and where the reactive group is capable of forming covalent links with the rubber during compounding or vulcanization and the polar group is capable of forming self-assemblies via intermolecular interactions, and wherein the reactive surfactant is incompatible with the rubber and mixing to form a dispersed mixture.

Another embodiment of the present invention provides a method of making a curable rubber composition as in any embodiment above, wherein mixing to form a dispersed mixture takes place at a temperature greater than a melting point of the reactive surfactant.

Another embodiment of the present invention provides a method of making a curable rubber composition as in any embodiment above, wherein the reactive group is selected from a sulfur-containing group.

Another embodiment of the present invention provides a method of making a curable rubber composition as in any embodiment above, wherein the hydrophobic linkage is a hydrocarbon chain.

Another embodiment of the present invention provides a method of making a curable rubber composition as in any embodiment above, wherein the polar group includes at least one β-alanine unit.

DETAILED DESCRIPTION OF ILLUSTRATIVE EMBODIMENTS

The present invention is generally directed to rubber compositions that are reinforced using reactive surfactants as reinforcing agents for bulk rubber vulcanizates that include ground rubber particles (GRPs). Composite rubber compounds, which may also be referred to as recycled rubber compositions, are prepared by direct addition of reactive surfactant solutions and GRPs into rubber latex.

Recycled rubber compositions of the present invention may be prepared by combining one or more rubber components, reactive surfactant, GRPs, and optionally, additional ingredients of the type typically found in reinforced rubber compositions, to form a curable rubber composition, and then at least partially curing the composition.

Suitable reactive surfactants for use in the present invention are represented by the formula:

where X is a reactive group, Y is a hydrophobic linkage, and Z is a polar group. X is a reactive group capable of forming covalent links with the rubber during compounding or vulcanization. Y is a hydrophobic linkage. Z is a polar group capable of forming self-assemblies via intermolecular interactions. Further, reactive surfactants suitable for the present invention are incompatible with the rubber.

The rubber employed may be virtually any curable rubber. The curable rubber will include unsaturated active sites that crosslink upon curing to form a thermoset rubber. In some embodiments, the thermoset rubber is referred to as fresh rubber prior to curing.

In some embodiments, the thermoset rubber is selected from the group consisting of polybutadiene, polyisoprene, poly(styrene-co-butadiene), poly (isobutylene-co-isoprene), natural rubber or a combination thereof.

In tire applications, the thermoset rubber may be selected from the group consisting of styrene-butadiene rubber, polybutadiene rubber, butadiene rubber, polyisoprene, or derivatives thereof. Standard additives include, but are not limited to, carbon black, stearic acid, antioxidants, waxes, silica, retarders, sulfur, accelerators, or materials of the like. Such standard additives may be added in the appropriate stages and amounts, if necessary.

In some embodiments, ground rubber particles (GRPs) are understood to be the granulated product of rubber recycling processes known in the art. Various recycling processes include, but are not limited to, continuous processing with a granulator or cracker mill, with or without the use of cryogenics. GRPs are classified according to their particle size, which is conventionally based upon actual dimension or mesh size (holes per inch: 10, 20, 30, 40, 50, 60, etc.).

The amount of GRPs included in rubber compositions according to the present invention is dependent on the size of the GRPs. Smaller GRPs may be included in larger amounts per hundred rubber (phr), wherein rubber is referring to the amount of fresh rubber present, than GRPs of a larger size.

In one or more embodiments, compositions of the present invention include at least 1 phr of GRPs. In one or more embodiments, compositions of the present invention include at least 5 phr of GRPs. In one or more embodiments, compositions of the present invention include at least 10 phr of GRPs. In one or more embodiments, compositions of the present invention include at least 15 phr of GRPs. In one or more embodiments, compositions of the present invention include at least 20 phr of GRPs. In one or more embodiments, compositions of the present invention include at least 25 phr of GRPs. In one or more embodiments, compositions of the present invention include at least 30 phr of GRPs. In one or more embodiments, compositions of the present invention include at least 35 phr of GRPs. In one or more embodiments, compositions of the present invention include at least 40 phr of GRPs. In one or more embodiments, compositions of the present invention include at least 45 phr of GRPs. In one or more embodiments, compositions of the present invention include at least 50 phr of GRPs.

In one or more embodiments, compositions of the present invention include at between 1 phr and 50 phr of GRPs. In one or more embodiments, compositions of the present invention include at between 5 phr and 45 phr of GRPs. In one or more embodiments, compositions of the present invention include at between 10 phr and 40 phr of GRPs. In one or more embodiments, compositions of the present invention include at between 15 phr and 35 phr of GRPs. In one or more embodiments, compositions of the present invention include at between 15 phr and 30 phr of GRPs. In one or more embodiments, compositions of the present invention include at between 15 phr and 25 phr of GRPs. In one or more embodiments, compositions of the present invention include at between 16 phr and 24 phr of GRPs. In one or more embodiments, compositions of the present invention include at between 17 phr and 23 phr of GRPs. In one or more embodiments, compositions of the present invention include at between 18 phr and 22 phr of GRPs. In one or more embodiments, compositions of the present invention include at between 19 phr and 21 phr of GRPs.

As detailed above, the reactive surfactant includes a reactive group, a hydrophobic linkage, and a polar group. The reactive surfactant includes at least one moiety that can react with the fresh rubber to form a covalent bond during compounding and vulcanization. The above said moiety is also capable of reacting with the multi-sulfidic bonds in vulcanized rubber to partially devulcanize the GRPs near the interface between the GRPs and fresh rubber during compounding and vulcanization. This moiety may be referred to as the reactive group. The reactive surfactant also includes at least one hydrophobic linkage. The reactive surfactant also includes at least one polar group that promotes the reactive surfactant to reside in the vicinity of the interface between the GRPs and fresh rubber and that can form self-assemblies via strong intermolecular interactions, such as hydrogen bonding, ion-dipole attraction, and Columbic attraction, or coordination bonds.

In one or more embodiments, the reactive group includes at least one functional group selected from sulfur-containing groups. Examples of sulfur-containing groups include thiol groups (S—H) and multi-sulfur groups (S—S, S—S—S, etc.).

In one or more embodiments, the hydrophobic linkage includes a hydrocarbon chain linking the reactive group and the polar groups together. In one or more embodiments, the hydrocarbon chain contains between 2 and 30 carbon atoms.

In one or more embodiments, the hydrophobic linkage includes a siloxane chain linking the reactive group and the polar groups together.

In one or more embodiments, the polar group includes at least one β-alanine unit. In one or more embodiments, the β-alanine unit is terminated by a terminal alkyl chain. In some embodiments the terminal alkyl chain has a length of 12 or fewer carbon atoms. In some embodiments the terminal alkyl chain has a length of 11 or fewer carbon atoms. In some embodiments the terminal alkyl chain has a length of 10 or fewer carbon atoms. In some embodiments the terminal alkyl chain has a length of 9 or fewer carbon atoms. In some embodiments the terminal alkyl chain has a length of 8 or fewer carbon atoms. In some embodiments the terminal alkyl chain has a length of 7 or fewer carbon atoms. In some embodiments the terminal alkyl chain has a length of 6 or fewer carbon atoms. In some embodiments the terminal alkyl chain has a length of 5 or fewer carbon atoms. In some embodiments the terminal alkyl chain has a length of 4 or fewer carbon atoms.

In one or more embodiments, the polar group includes a phosphate anion charge balanced by a cation with the general formula: $-(RO)PO_3^-(1/n)cation^{n+}$.

In one or more embodiments, the polar group includes a sulfonate anion charge balanced by a cation with the general formula: $-SO_3^-(1/n)cation^{n+}$ where n=1 or 2.

The amount of reactive surfactant required to practice rubber compositions of the present invention varies based on the size and amounts of GRPs used. The amount of reactive surfactant may be expressed as parts per hundred rubber (phr), wherein rubber is referring to the amount of fresh rubber present. In one or more embodiments, the rubber composition includes at least 1.0 phr of reactive surfactant. In one or more embodiments, the rubber composition includes at least 1.1 phr of reactive surfactant. In one or more embodiments, the rubber composition includes at least 1.2 phr of reactive surfactant. In one or more embodiments, the rubber composition includes at least 1.3 phr of reactive surfactant. In one or more embodiments, the rubber composition includes at least 1.4 phr of reactive surfactant. In one or more embodiments, the rubber composition includes at least 1.5 phr of reactive surfactant. In one or more embodiments, the rubber composition includes at least 1.6 phr of reactive surfactant. In one or more embodiments, the rubber composition includes at least 1.7 phr of reactive surfactant. In one or more embodiments, the rubber composition includes at least 1.8 phr of reactive surfactant. In one or more embodiments, the rubber composition includes at least 1.9 phr of reactive surfactant. In one or more embodiments, the rubber composition includes at least 2.0 phr of reactive surfactant. In one or more embodiments, the rubber composition includes at least 2.1 phr of reactive surfactant. In one or more embodiments, the rubber composition includes at least 2.2 phr of reactive surfactant. In one or more embodiments, the rubber composition includes at least 2.3 phr of reactive surfactant. In one or more embodiments, the rubber composition includes at least 2.4 phr of reactive surfactant. In one or more embodiments, the rubber composition includes at least 2.5 phr of reactive surfactant. In one or more embodiments, the rubber composition includes at least 2.6 phr of reactive surfactant. In one or more embodiments, the rubber composition includes at least 2.7 phr of reactive surfactant. In one or more embodiments, the rubber composition includes at least 2.8 phr of reactive surfactant. In one or more embodiments, the rubber composition includes at least 2.9 phr of reactive surfactant. In one or more embodiments, the rubber composition includes at least 3.0 phr of reactive surfactant.

In one or more embodiments, the rubber composition includes between 1.0 phr and 3.0 of reactive surfactant. In one or more embodiments, the rubber composition includes between 1.1 phr and 2.9 of reactive surfactant. In one or more embodiments, the rubber composition includes between 1.2 phr and 2.8 of reactive surfactant. In one or more embodiments, the rubber composition includes between 1.3 phr and 2.7 of reactive surfactant. In one or more embodiments, the rubber composition includes between 1.4 phr and 2.6 of reactive surfactant. In one or more embodiments, the rubber composition includes between 1.5 phr and 2.5 of reactive surfactant. In one or more embodiments, the rubber composition includes between 1.6 phr and 2.4 of reactive surfactant. In one or more embodiments, the rubber composition includes between 1.7 phr and 2.4 of reactive surfactant. In one or more embodiments, the rubber composition includes between 1.8 phr and 2.3 of reactive surfactant. In one or more embodiments, the rubber composition includes between 1.9 phr and 2.2 of reactive surfactant.

In one or more embodiments, the rubber composition includes a ratio of GRPs:reactive surfactant, by weight, of 35:1. In one or more embodiments, the rubber composition includes a ratio of GRPs:reactive surfactant, by weight, of 30:1. In one or more embodiments, the rubber composition includes a ratio of GRPs:reactive surfactant, by weight, of 25:1. In one or more embodiments, the rubber composition includes a ratio of GRPs:reactive surfactant, by weight, of 24:1. In one or more embodiments, the rubber composition includes a ratio of GRPs:reactive surfactant, by weight, of 23:1. In one or more embodiments, the rubber composition includes a ratio of GRPs:reactive surfactant, by weight, of 22:1. In one or more embodiments, the rubber composition includes a ratio of GRPs:reactive surfactant, by weight, of 21:1. In one or more embodiments, the rubber composition includes a ratio of GRPs:reactive surfactant, by weight, of 20:1. In one or more embodiments, the rubber composition includes a ratio of GRPs:reactive surfactant, by weight, of 19:1. In one or more embodiments, the rubber composition includes a ratio of GRPs:reactive surfactant, by weight, of 18:1. In one or more embodiments, the rubber composition includes a ratio of GRPs:reactive surfactant, by weight, of 17:1. In one or more embodiments, the rubber composition includes a ratio of GRPs:reactive surfactant, by weight, of 16:1. In one or more embodiments, the rubber composition includes a ratio of GRPs:reactive surfactant, by weight, of 15:1.

Optional ingredients include antioxidants, antidegradants, additional fillers, oils, plasticizers, resins, waxes, and curatives.

Advantageously, the reactive surfactant may be mixed directly with a fresh rubber and GRPs to enhance adhesion between the GRPs and the fresh rubber and to alleviate the modulus contrast at the interface between the GRPs and the fresh rubber. The reactive surfactant is incompatible with fresh rubber. For the purposes of the present invention, incompatibility between reactive surfactant and the fresh rubber means that the reactive surfactant will tend not to disperse within the bulk fresh rubber and instead the reactive surfactant will aggregate and reside at the interface of the fresh rubber and the surface of the GRPs. During compounding and/or vulcanization the reactive surfactant interacts with GRPs which undergo devulcanization at the surface to enhance adhesion at the interface between a vulcanized rubber, in the form of GRPs, and a fresh rubber.

Various procedures and methods are suitable for preparing rubber compositions according to the present invention. Generally, rubber compositions according to the present invention are compounded by preheating a mixer mixing a masterbatch, adding GRPs and reactive surfactant, mixing the masterbatch, GRPs, and reactive surfactant to form a compound, increasing the temperature during the mixing of the masterbatch, GRPs, and reactive surfactant, dumping and cooling the compound, cooling the mixer, adding the compound, adding curing agents, mixing the compound and curing agents, and dumping the compound with the curing agents prior to curing the rubber composition.

Increasing the temperature of the mixture of masterbatch, GRPs, and reactive surfactant allows for the reactive surfactant to readily locate and reside at the interface of the GRPs and masterbatch which improves the performance characteristics of the resultant rubber composition after curing.

In one or more embodiments, the rubber composition may be prepared by mechanical mixing, using an internal mixer, twin screw extruder, or two roll mills. In one or more embodiments, a curable rubber composition may be prepared by mixing, and then one or more curatives may be added to the mixture by mechanical mixing. In other embodiments, one or more curatives may be added during the mixing process.

Mixing of the masterbatch, GRPs, and reactive surfactant is performed at a temperature greater than the melting point of the reactive surfactant. Mixing in such a condition allows for the reactive surfactant to better disperse and diffuse to the interface of the masterbatch and GRPs.

In one or more embodiments, mixing of the masterbatch, GRPs, and reactive surfactant is performed at a temperature of 110° C. or greater. In one or more embodiments, mixing of the masterbatch, GRPs, and reactive surfactant is performed at a temperature of 120° C. or greater. In one or more embodiments, mixing of the masterbatch, GRPs, and reactive surfactant is performed at a temperature of 130° C. or greater. In one or more embodiments, mixing of the masterbatch, GRPs, and reactive surfactant is performed at a temperature of 140° C. or greater. In one or more embodiments, mixing of the masterbatch, GRPs, and reactive surfactant is performed at a temperature of 150° C. or greater. In one or more embodiments, mixing of the masterbatch, GRPs, and reactive surfactant is performed at a temperature of 160° C. or greater. In one or more embodiments, mixing of the masterbatch, GRPs, and reactive surfactant is performed at a temperature of 170° C. or greater.

To demonstrate the practice of the present invention, the following examples have been prepared and evaluated. The examples should not, however, be viewed as limiting the scope of the invention. The claims will serve to define the invention.

EXAMPLES

Reactive Surfactants

A1 and A2 are reactive surfactants according to the present invention.

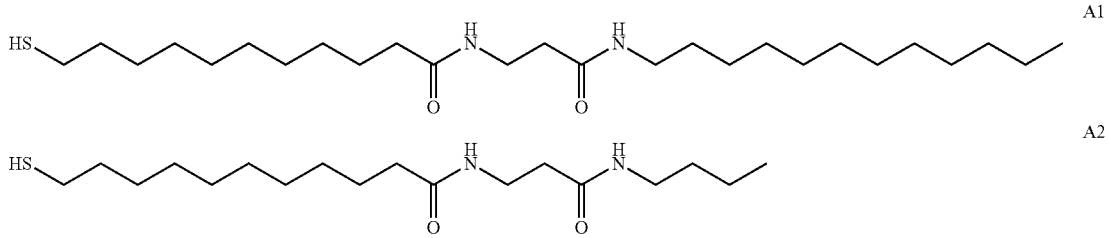

Compounding and Vulcanization

Compounding was performed by first creating a masterbatch containing 100 phr (part per hundred) of butadiene rubber (CB PBD 1220), 40 phr of carbon black N330, 2 phr of stearic acid and 2 phr of zinc oxide is used in this work. It was cured at 150° C. for the time of its $t_{90}$. The cured MC was ground into 60 mesh ground rubber particles (GRPs) cryogenically.

TABLE 1

Recipes for compounds MC, Ref and those containing A1.

| Ingredients | MC | Ref | 1 wt % A1 | 2 wt % A1 |
| --- | --- | --- | --- | --- |
| Masterbatch/g | 140 | 116.67 | 116.67 | 116.67 |
| GRP/g | 0 | 23.33 | 23.33 | 23.33 |
| A1/g | 0 | 0 | 1.42 | 2.84 |
| Sulfur/g | 1.25 | 1.04 | 1.04 | 1.04 |
| TBBS/g | 0.83 | 0.69 | 0.69 | 0.69 |

Compound MC consists of the masterbatch and curing agents with formulation concentrations according to Table 1. Compound Ref consists of the masterbatch, GRP, and curing agents with formulation concentrations according to Table 1. Compound 1 wt % A1, consisting of the masterbatch, GRP, A1, and curing agents with formulation concentrations according to 1 wt % A1 in Table 1. Compound 2 wt % A1, consisting of the masterbatch, GRP, A1, and curing agents with formulation concentrations according to 2 wt % A1 in Table 1. For all compounds, the curing time was the t90 of the compound at 150° C.

The recipes listed above, in Table 1, were compounded according to Procedure A detailed in Table 2.

TABLE 2

Procedure A for compounding.

| Time (min) | Procedure |
|---|---|
| 0 | Preheat mixer to 50° C. |
| 0-2 | Mix masterbatch for 2 min at 60 rpm |
| 2 | Add GRP and A1, if present |
| 2-4 | Mix for 2 min at 60 rpm |
| 4 | Add curing agents |
| 4-7 | Mix for 3 min at 60 rpm |
| 7 | Dump compound |

Compound 1 wt %-A1 and Compound 2 wt %-A1 were mixed at a temperature of about 110° C. according to Procedure A. The compounds mixed at 110° C. are referred to as Compound 1 wt %-A1-110° C. and Compound 2 wt %-A1-110° C.

Compounds according to the formulations in Table 1 were also compounded according to Procedure B detailed in Table 3.

TABLE 3

Procedure B for compounding.

| Time (min) | Procedure |
|---|---|
| 0 | Preheat mixer to 50° C. |
| 0-2 | Mix masterbatch for 2 min at 60 rpm |
| 2 | Add GRP and A1, if present |
| 2-3 | Mix for 1 min at 60 rpm |
| 3 | Change mixing temperature to 160° C. |
| 3-8 | Mix for 5 min at 60 rpm |
| 8 | Dump compound and change temperature to 50° C. |
| 8-28 | The temperature of mixer is cooled down to 50° C. |
| 28 | Add compound into mixer |
| 28-29 | Mix for 1 min at 60 rpm |
| 29 | Add curing agents |
| 29-32 | Mix for 3 min at 60 rpm |
| 32 | Dump compound |

Compound 1 wt %-A1 and Compound 2 wt %-A1 were mixed at a temperature of about 160° C. according to Procedure B. The compounds mixed at 160° C. are referred to as Compound 1 wt %-A1-160° C. and Compound 2 wt %-A1-160° C. For all compounds, the curing time was the $t_{90}$ of the compound at 150° C.

Compounds involving A2 were mixed according to the formulations in Table 4.

TABLE 4

Recipes for compounds MC, Ref and those containing A2.

| Ingredients | 0.5 wt % A2 | 1 wt % A2 | 2 wt % A2 |
|---|---|---|---|
| Masterbatch/g | 100 | 100 | 100 |
| GRP/g | 19.2 | 19.2 | 19.2 |
| A2/g | 0.60 | 1.20 | 2.40 |
| Sulfur/g | 0.86 | 0.86 | 0.86 |
| TBBS/g | 0.57 | 0.57 | 0.57 |

Compounds according to the formulations in Table 4 were also compounded according to procedure detailed in Table 5.

TABLE 5

Mixing Procedure for compounds containing A2.

| Time (min) | Procedure |
|---|---|
| 0 | Preheat mixer to 50° C. |
| 0-2 | Mix masterbatch for 2 min at 60 rpm |

TABLE 5-continued

Mixing Procedure for compounds containing A2.

| Time (min) | Procedure |
|---|---|
| 2 | Add GRP and A2 |
| 2-3 | Mix for 1 min at 60 rpm |
| 3 | Change mixing temperature to 160° C. |
| 3-8 | Mix for 5 min at 60 rpm |
| 8 | Dump compound and change temperature to 50° C. |
| 8-28 | The temperature of mixer is cooled down to 50° C. |
| 28 | Add compound into mixer |
| 28-29 | Mix for 1 min at 60 rpm |
| 29 | Add curing agents |
| 29-32 | Mix for 3 min at 60 rpm |
| 32 | Dump compound |

Curing Characteristics of Compounds

The curing characteristics of compounds MC, Ref, C-1 wt % A1-110C, C-1 wt % A1-160C and C-2 wt % A1-160C are summarized in Table 6.

TABLE 6

Curing characteristics of compounds MC, Ref, C-1 wt % A1-110C, C-1 wt % A1-160C and C-2 wt % A1-160C.

| Entry | ts2 (min) | $t_{90}$ (min) | $M_L$ (dNm) | $M_H$ (dNm) | ΔM (dNm) |
|---|---|---|---|---|---|
| MC | 11.58 | 26.02 | 1.81 | 12.52 | 10.71 |
| Ref | 12.00 | 27.40 | 2.72 | 10.49 | 7.77 |
| C-1 wt % A1-110C | 5.32 | 15.09 | 2.55 | 10.51 | 7.96 |
| C-1 wt % A1-160C | 7.34 | 15.25 | 2.27 | 10.40 | 8.13 |
| C-2 wt % A1-160C | 6.33 | 13.95 | 2.17 | 11.69 | 9.52 |

C-1 wt % A1-110C has worse mechanical properties in comparison to Ref. This illustrates that mixing must be conducted above the melting temperature of the surfactant so that the surfactant can be dispersed and diffuse to the interface. The melting point of A1 is higher than the mixing temperature (110° C.), the low mixing temperature results in less dispersion of A1. When the mixing temperature is increased to 160° C., compound C-1 wt % A1-160C has better mechanical properties than C-1 wt % A1-110C and Ref. When more A1 is added into C-2 wt % A1-160C, the better mechanical properties are achieved.

The curing characteristics of compounds MC, Ref, C-0.5 wt % A2, C-1 wt % A2, and C-2 wt % A2 are summarized in Table 7.

TABLE 7

Curing characteristics of MC, Ref, C-0.5 wt % A2, C-1 wt % A2, and C-2 wt % A2.

| Entry | ts2 (min) | $t_{90}$ (min) | $M_L$ (dNm) | $M_H$ (dNm) | ΔM (dNm) |
|---|---|---|---|---|---|
| MC | 11.58 | 26.02 | 1.81 | 12.52 | 10.71 |
| Ref | 12.00 | 27.40 | 2.72 | 10.49 | 7.77 |
| C-0.5 wt % A2 | 5.32 | 15.09 | 2.55 | 10.51 | 7.96 |
| C-1 wt % A2 | 7.34 | 15.25 | 2.27 | 10.40 | 8.13 |
| C-2 wt % A2 | 6.33 | 13.95 | 2.17 | 11.69 | 9.52 |

Mechanical Properties of Compounds

The mechanical properties of compounds F3, Ref-F3, C-1 wt % A1-110C, C-1 wt % A1-160C and C-2 wt % A1-160C are summarized in Table 8.

TABLE 8

Mechanical properties of compounds F3, Ref-F3, C-1 wt % A1-110C, C-1 wt % A1-160C and C-2 wt % A1-160C.

| Entry | $\varepsilon_b$ (%) | $\sigma_b$ (MPa) | $\sigma_{100\%}$ (MPa) | $\sigma_{300\%}$ (MPa) | Toughness ($10^6$ J/m$^3$) |
|---|---|---|---|---|---|
| MC | 492 ± 17 | 16.6 ± 0.9 | 1.97 ± 0.13 | 8.22 ± 0.43 | 34 ± 3 |
| Ref | 356 ± 8 | 7.6 ± 0.3 | 1.50 ± 0.11 | 5.90 ± 0.39 | 11 ± 1 |
| C-1 wt % A1-110C | 332 ± 8 | 7.27 ± 0.19 | 1.60 ± 0.08 | 6.26 ± 0.30 | 10 ± 1 |
| C-1 wt % A1-160C | 398 ± 10 | 10.07 ± 0.38 | 1.65 ± 0.03 | 6.44 ± 0.06 | 16 ± 1 |
| C-2 wt % A1-160C | 402 ± 28 | 11.37 ± 0.92 | 1.83 ± 0.09 | 7.26 ± 0.47 | 19 ± 3 |

The mechanical properties of vulcanizates MC, Ref-F3, C-0.5 wt % A2, C-1 wt % A2 and C-2 wt % A2 are summarized in Table 9.

TABLE 9

Summary of mechanical properties of vulcanizates MC, Ref-F3, C-0.5 wt % A2, C-1 wt % A2 and C-2 wt % A2.

| vulcanizate | $\sigma_{100\%}$ (MPa) | $\sigma_{300\%}$ (MPa) | $\varepsilon_b$ (%) | $\sigma_b$ (MPa) | Toughness ($10^6$ J/m$^3$) |
|---|---|---|---|---|---|
| MC | 2.00(0.04) | 9.17(0.17) | 447(13) | 16.0(0.9) | 30.3(2.6) |
| Ref | 1.57(0.03) | 6.96(0.16) | 351(9) | 9.0(0.3) | 12.7(0.7) |
| C-0.5 wt % A2 | 1.97(0.06) | 8.51(0.18) | 403(8) | 13.7(0.8) | 22.1(1.5) |
| C-1 wt % A2 | 2.12(0.07) | 8.59(0.30) | 400(21) | 13.7(1.3) | 22.1(2.7) |
| C-2 wt % A2 | 2.05(0.06) | 7.89(0.23) | 428(7) | 13.6(0.2) | 24.1(0.5) |

In light of the foregoing, it should be appreciated that the present invention significantly advances the art by providing a reinforced rubber composition that is structurally and functionally improved in several ways. While particular embodiments of the invention have been disclosed in detail herein, it should be appreciated that the invention is not limited thereto or thereby because variations on the invention herein will be readily appreciated by those of ordinary skill in the art. The scope of the invention shall be appreciated from the claims that follow.

What is claimed is:

1. A curable rubber composition comprising:
    a vulcanizable rubber;
    a plurality of ground vulcanized rubber particles;
    a reactive surfactant represented by the formula:

X—Y—Z where X is a reactive group, Y is a hydrophobic linkage, and Z is a polar group, and where the reactive group is capable of forming covalent links with the vulcanizable rubber during compounding or vulcanization and the polar group is capable of forming self-assemblies via intermolecular interactions; and wherein the reactive surfactant is incompatible with the vulcanizable rubber; and
    wherein a ratio of the plurality of ground rubber particles to the reactive surfactant, by weight, is from 15:1 or greater.

2. The curable rubber composition of claim 1, wherein the curable rubber composition includes at least 1 parts per hundred rubber of the plurality of ground vulcanized rubber particles.

3. The curable rubber composition of claim 1, wherein the reactive group is selected from a sulfur-containing group.

4. The curable rubber composition of claim 3, wherein the reactive group is a thiol group.

5. The curable rubber composition of claim 1, wherein the hydrophobic linkage is a hydrocarbon chain.

6. The curable rubber composition of claim 4, wherein the hydrocarbon chain includes between 2 and 30 carbon atoms.

7. The curable rubber composition of claim 1, wherein the polar group includes at least one β-alanine unit.

8. The curable rubber composition of claim 7, wherein the polar group includes two β-alanine units, wherein at least one of the two β-alanine units is terminated by a terminal alkyl chain.

9. The curable rubber composition of claim 1, wherein the polar group includes a phosphate anion charge balanced by a cation with the general formula: —(RO)PO$_3^-$(1/n)cation$^{n+}$.

10. The curable rubber composition of claim 1, wherein the polar group includes a sulfonate anion charge balanced by a cation with the general formula: —SO$_3^-$(1/n)cation$^{n+}$ where n=1 or 2.

11. A curable rubber composition comprising:
    a vulcanizable rubber;
    a plurality of ground vulcanized rubber particles;
    a reactive surfactant represented by the formula:

X—Y—Z where X is a reactive group, Y is a hydrophobic linkage, and Z is a polar group, and where the reactive group is capable of forming covalent links with the vulcanizable rubber during compounding or vulcanization and the polar group is capable of forming self-assemblies via intermolecular interactions;
    wherein the reactive surfactant is incompatible with the vulcanizable rubber; and
    wherein the curable rubber composition includes between 0.5 parts per hundred rubber and 2.5 parts per hundred rubber of the reactive surfactant.

12. The curable rubber composition of claim 1, wherein the curable rubber composition includes a ratio of the plurality of ground rubber particles to the reactive surfactant, by weight, of from 15:1 to 50:1.

13. The curable rubber composition of claim 1, further comprising:
    optionally one or more of antioxidants, antidegradants, additional fillers, oils, plasticizers, resins, waxes, and curatives.

14. The curable rubber composition of claim 1, wherein the reactive surfactant is mixed directly with vulcanizable rubber and the plurality of ground vulcanized rubber particles.

15. A method of making a curable rubber composition that is prepared by a process comprising:
    mixing a masterbatch comprising a vulcanizable rubber;
    providing a plurality of ground vulcanized rubber particles and a reactive surfactant represented by the formula:

X—Y—Z where X is a reactive group, Y is a hydrophobic linkage, and Z is a polar group, and where the reactive group is capable of forming covalent links with the vulcanizable rubber during compounding or vulcanization and the polar group is capable of forming self-assemblies via intermolecular interactions, and wherein the reactive surfactant is incompatible with the vulcanizable rubber;

wherein a ratio of the plurality of ground rubber particles to the reactive surfactant, by weight, is from 15:1 or greater; and mixing to form a dispersed mixture, wherein the step of mixing to form the dispersed mixture takes place at a temperature greater than a melting point of the reactive surfactant.

16. The method of claim 15, wherein mixing to form a dispersed mixture takes place at a temperature greater than a melting point of the reactive surfactant.

17. The method of claim 16, wherein the reactive group is selected from a sulfur- containing group.

18. The method of claim 16, wherein the hydrophobic linkage is a hydrocarbon chain.

19. The method of claim 16, wherein the polar group includes at least one β-alanine unit.

\* \* \* \* \*